United States Patent [19]

Bach

[11] Patent Number: 5,699,325
[45] Date of Patent: Dec. 16, 1997

[54] TRANSPARENT SCRATCHPROOF CLOSURE ELEMENT FOR A WATCH CASE AND WATCH CASE PROVIDED WITH AN ELEMENT OF THIS TYPE

[75] Inventor: Michael Bach, Bienne, Switzerland

[73] Assignee: Montres Rado Sa, Lengnau, Switzerland

[21] Appl. No.: 566,123

[22] Filed: Dec. 1, 1995

[30] Foreign Application Priority Data

Dec. 16, 1994 [CH] Switzerland .............. 03 808/94-0

[51] Int. Cl.[6] .............. G02B 1/00; C04B 35/58
[52] U.S. Cl. .............. 368/286; 368/280; 368/316; 428/698
[58] Field of Search .............. 428/698; 368/280, 368/316, 286

[56] References Cited

U.S. PATENT DOCUMENTS

| | | | |
|---|---|---|---|
| 4,481,300 | 11/1984 | Hartnett et al. | 501/98 |
| 4,511,665 | 4/1985 | Nagato et al. | 501/96 |
| 4,788,167 | 11/1988 | Mathers et al. | 501/153 |
| 4,855,264 | 8/1989 | Mathers et al. | 501/98 |
| 5,096,862 | 3/1992 | Mathers et al. | 501/153 |
| 5,231,062 | 7/1993 | Mathers et al. | 501/96 |

*Primary Examiner*—Archene Turner
*Attorney, Agent, or Firm*—Sughrue,Mion,Zinn,Macpeak & Seas, PLLC

[57] ABSTRACT

The invention concerns a transparent scratchproof watch case closure element, characterized in that it is realized by sintering a pressed part or a injected part having a general shape similar to that of said closure element, said part being essentially formed of a powder or a mixture of powders of ceramic material and in that said closure element is transparent in the visible spectrum.

11 Claims, 2 Drawing Sheets

TRANSPARENT SCRATCHPROOF CLOSURE ELEMENT FOR A WATCH CASE AND WATCH CASE PROVIDED WITH AN ELEMENT OF THIS TYPE

BACKGROUND OF THE INVENTION

The present invention concerns a transparent scratchproof closure element for a watch case, and in particular, a watch glass or a back cover having a low cost price regardless of the complexity of its shape, for example whether flat or spherical, and having a Vickers hardness greater or equal to 1100.

The present invention also concerns a watch case provided with an element of this type.

Transparent closure elements for watch cases and in particular watch glasses for protecting the dials and hands or suchlike, and transparent back covers for protecting movements, are most often either realised in synthetic material, or in mineral glass because of their relatively low cost price. The respective hardness of these categories of materials of course determines the resistance of the watch glasses to scratching. To clarify, transparent closure elements realised in synthetic material such as Plexiglas have a Vickers hardness of around 100 and mineral or natural glass has a Vickers hardness of around 900. Experience has shown that watch glasses realised in these two categories of materials have a poor resistance to scratching by certain very hard agents such as silica contained in dust, marble or sand which is constantly present in our environment, even if mineral glass resists these attacks better than synthetic materials. Consequently, the aesthetic appearance of these types of watch glasses or back covers are relatively quickly altered by scratches.

In order to avoid these disadvantages sapphire or aloxite have been used for manufacturing transparent watch glasses and back covers, the hardness of this material being close to that of diamond. These transparent sapphire closure elements have a very good resistance to the attacks of external agents but have, however, the major disadvantage of being long, complex and laborious to manufacture and of having a very high cost price which considerably limits their large scale use. By way of illustration, 80% of the cost of the simple manufacture of the "pears" of sapphire from which are cut the disks which after numerous subsequent machining operations, will form these transparent watch case closure elements, consists of the electrical energy requirements of manufacturing said pears. Further, an average sized sapphire "pear" manufacturing plant consumes annually as much electricity as a town of around 50,000 inhabitants.

Thus one can easily understand, given the current increasing concerns as regards the saving of energy, the necessity of finding an alternative solution, in particular a more economic solution, to using artificial sapphire in order to realise transparent watch case closure elements having a high level of resistance to scratches and intended to be used in a wide range of watches.

Further, the realisation of the finished product from these "pears" leads to significant wastage of raw material, principally at the machining stage.

The applicant noticed during the study of new solutions that the application of aluminium oxynitride, or sintered yttrium oxide to the manufacturing of transparent closure elements such as watch glasses is particularly advantageous since glasses realised in this manner fulfil perfectly the requirements necessary for the realisation of transparent scratchproof watch case closure elements both from the economic point of view and from the point of view of their useful properties, their mechanical properties and their transparency.

The present invention thus concerns more precisely a transparent scratchproof watch case closure element, characterised in that it is realised by sintering a pressed part or an injected part having a general shape similar to that of said closure element, said part being formed essentially of a powder or a mixture of powders of ceramic material essentially comprising aluminium oxynitride or yttrium oxide and in that said closure element is transparent in the visible spectrum, said closure element having a light absorption coefficient in the visible spectrum not exceeding 30%.

Consequently, the complicated and costly manufacture of artificial sapphire and its laborious and equally costly transformation into transparent watch case closure elements, such as watch glasses and/or back covers are replaced by a simple almost final shaping of the desired element, for example in a mould by pressing or injecting, followed by sintering and polishing.

It will be noted that in an advantageous manner the production of these closure elements with the aid of these materials is carried out without significant waste of material, which leads to a decrease in the global production cost of these elements.

Moreover the quality of the closure elements realised by sintering a mixture of powders essentially comprising aluminium oxynitride or yttrium oxide is so good that no further working is necessary to obtain the final shape of said closure element and that a simple final diamond polishing operation is all that is required.

By way of example, a flat watch glass may be directly obtained by axial pressing with dimensional tolerances of approximately +/−0.5%.

Another significant advantage of the choice of these materials for the manufacture of watch case closure elements is that, unlike artificial sapphire, they are polycrystalline and consequently have isotropic properties. If one imagined sintering sapphire powder, the item obtained would not be transparent because of the relative anisotropy of the optical properties of grains of sapphire. There is no problem of this type with the aforementioned isotropic materials.

It should be noted that these materials are not allergenic.

The present invention also concerns a watch case comprising a middle part characterised in that it includes in addition a transparent scratchproof closure element which is realised by sintering a pressed part or an injected part having a general shape similar to that of said closure element, said part being formed essentially of a powder or a mixture of powders of ceramic material essentially comprising aluminium oxynitride or yttrium oxide and in that said closure element is transparent in the visible spectrum, said closure element having a light absorption coefficient in the visible spectrum not exceeding 30%.

In accordance with another of its aspects, the present invention also concerns a wristwatch comprising a watch case and an articulated link bracelet, said watch case comprising a middle part and two closure elements such as a watch glass and a back cover characterised in that each link of the bracelet and at least one of the closure elements are realised by sintering a pressed part or an injected part having a general shape similar respectively to that of said link and of said closure element, said part being essentially formed of a powder or a mixture of powders of ceramic material essentially comprising aluminium oxynitride or yttrium oxide and in that said link and said closure element are transparent in the visible spectrum, said closure element having a light absorption coefficient in the visible spectrum not exceeding 30%.

Other features and advantages of the present invention will appear more clearly upon reading the following description of examples of particular embodiments, said description being made by way of non limiting example and with reference to the attached drawings in which:

DESCRIPTION OF PREFERRED EMBODIMENTS

Figure 1:
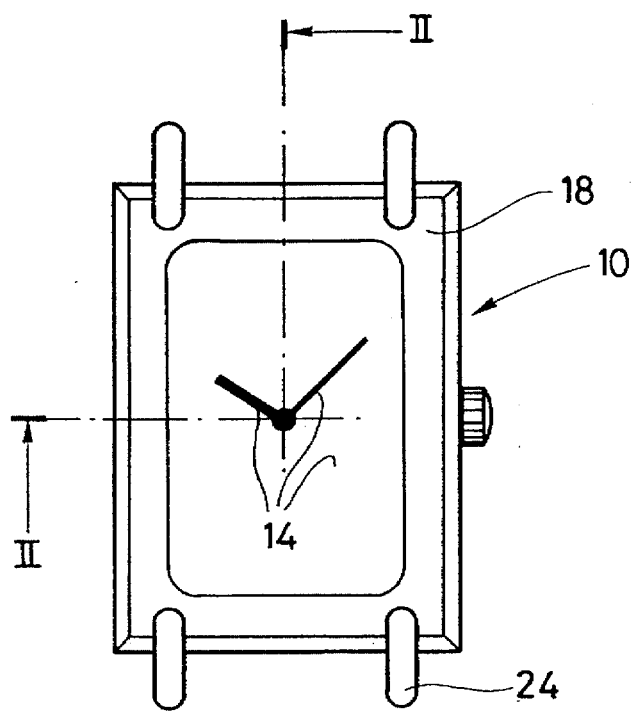
FIGS. 1 and 2 show a watch provided with a transparent scratchproof closure element according to the invention, in this case a watch glass, respectively a plan view and a cross-section along the line II—II.
Figure 2:
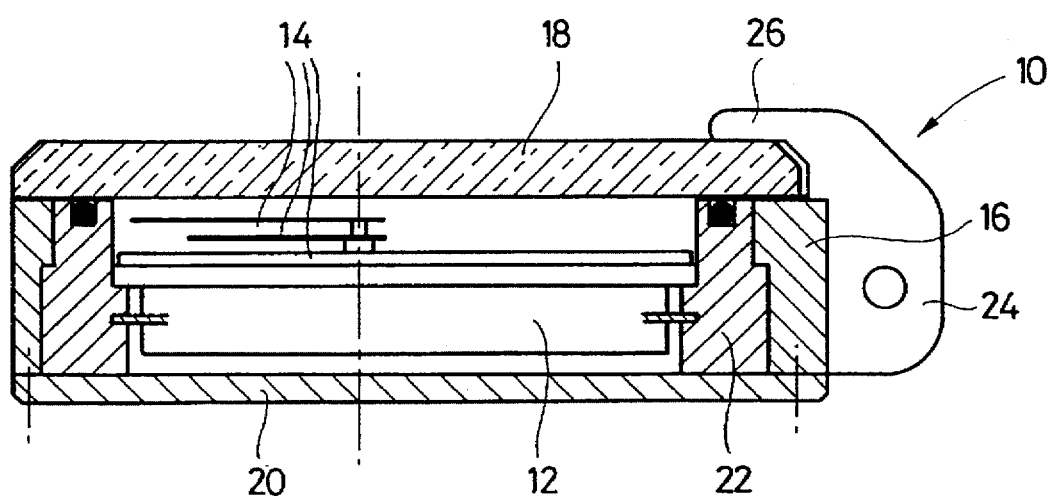

The watch shown in FIGS. 1 and 2 comprises a case 10, a movement 12 and display means 14, in this case hands and a dial. Case 10 comprises a middle part 16, a first and a second element for closure the case, respectively a watch glass 18 and a back cover 20, as well as a fitting-ring 22. Middle part 16 is provided with four horns 24 which extend above the body of the middle part and form claws 26 which define, with the body of the middle part, a slide-bar inside which water glass 18 is housed. Back cover 20 is fixed to middle part 16 by means of screws not shown in the drawing. It also abuts fitting-ring 22. The latter extends across the entire height of middle part 16 and it abuts watch glass 18. Thus, when back cover 20 is fixed by means of screws, fitting-ring 22 exerts pressure on watch glass 18 which abuts claws 26. This construction is well known to the man skilled in the art, thus it is unnecessary to describe it in a more explicit manner.

According to the invention, the transparent closure element formed by watch glass 18 is a practically scratchproof element realised by sintering a pressed part or an injected part having a general shape similar to that of the watch glass. The part is essentially formed from a powder or a mixture of powders of ceramic material, and if necessary, a binding agent, which once sintered and polished has transparent features in the visible spectrum.

More precisely, the powder or mixture of powders essentially comprises aluminium oxynitride or yttrium oxide. The watch glass realised in this manner is of course completely transparent in the visible spectrum after sintering and thus protects the display means whilst enabling them to be read. In any case, the light absorption coefficient in the visible spectrum of the watch glass does not exceed 30 after sintering and polishing.

The watch provided with a transparent closure element according to the invention, in the example described watch glass 18, is consequently particularly well protected against external attacks.

In order to achieve a closure element such as watch glass 18 described above, the manufacturing methods described respectively in patent application FR 2556711 and U.S. Pat. No. 4,761,390 are used according to whether one uses as starting material a mixture of ceramic powders essentially comprising aluminium oxynitride or yttrium oxide. It should be noted that the patents cited above are incorporated here by reference.

The mixture of powders essentially comprising aluminium oxynitride or yttrium oxide may of course include if required a certain number of additional elements in small quantities in order to obtain items with specific properties. These additional elements and their effects are well known to the man skilled in the art.

By way of indication, the Vickers hardness of a closure element having the composition $Al_{23-1/x}O_{27+x}N5_{-x}$, X being between 0.429 and 2 is greater than 1100, and close to that of sapphire. The measurements carried out have given results of hardness of the magnitude of 1,850 HV. Further its light absorption coefficient in the visible spectrum is around 15% for a thickness of around 2.6 mm.

Figure 3:
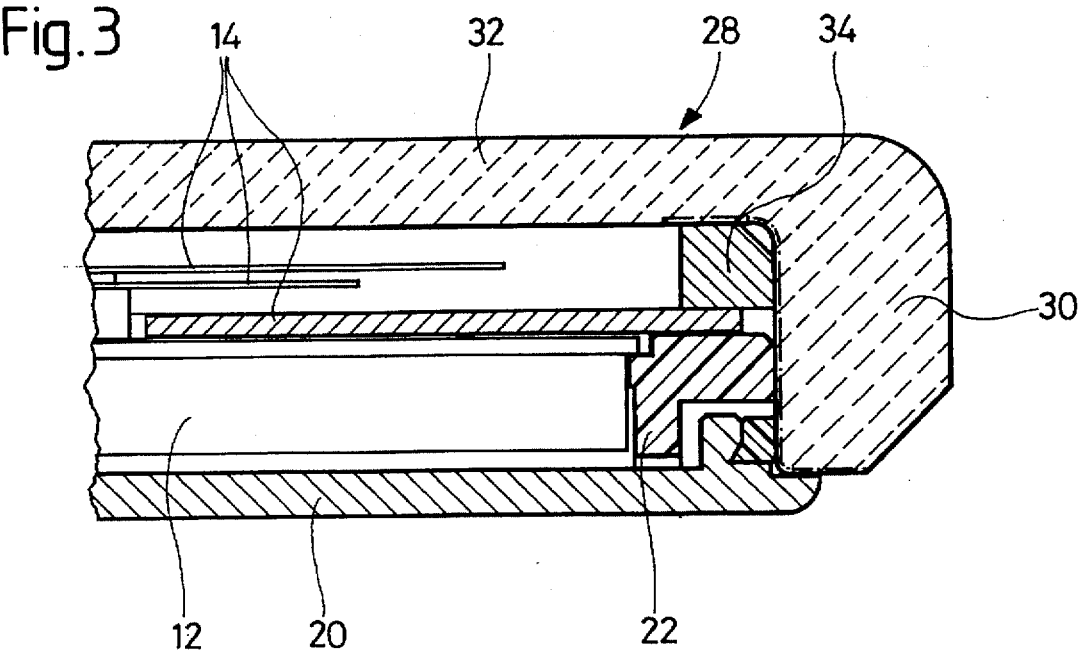
FIG. 3 shows a partial profile and cross-sectional view of a watch provided with a transparent scratchproof closure element according to the invention, in this case a glass middle part.

Referring now to FIG. 3 one sees another watch which is provided with a case closure element according to the invention and in which the elements identical to those in FIGS. 1 and 2 have the same numerical references.

One can see in FIG. 3 a middle part-watch glass assembly 28 of round shape forming the transparent closure element of the watch case. This middle part-watch glass assembly 28 comprises a relatively thick rim 30 and a thinner central plate 32. According to the invention, this middle part-watch glass assembly 28 is also realised as in the previously described example by sintering a pressed part or an injected part having a general shape similar to that of the middle part-watch glass assembly, the part being formed essentially of a powder or of a mixture of powders essentially comprising aluminium oxynitride or yttrium oxide. Of course, the methods used to obtain the middle part-watch glass assembly are the same as those described in the aforementioned patents.

Middle part-watch glass assembly 28 thus forms a single, homogenous, transparent scratchproof piece. Rim 30 plays the same role as the middle part in a conventional watch case, while central plate 32 fulfills the same function as the watch glass. If one so desires, the internal surface of rim 30 may be covered with a masking layer 34 (shown in dotted lines in the drawing) in the form of a metal-coating or suchlike in order to hide the elements situated inside the case such as for example fitting-ring 22 and flange 34. This layer of metal-coating may of course be of any colour. According to an alternative embodiment not shown, the external surface of this rim 30 may be treated in an appropriate manner to give the case a particular look.

This example illustrates well the advantage of the transparent scratchproof closure elements according to the invention which may be obtained directly by sintering in complex definitive shapes. The realisation of a transparent scratchproof closure element of this type by conventional techniques, in machined artificial sapphire, would be prohibitively expensive.

Figure 4:
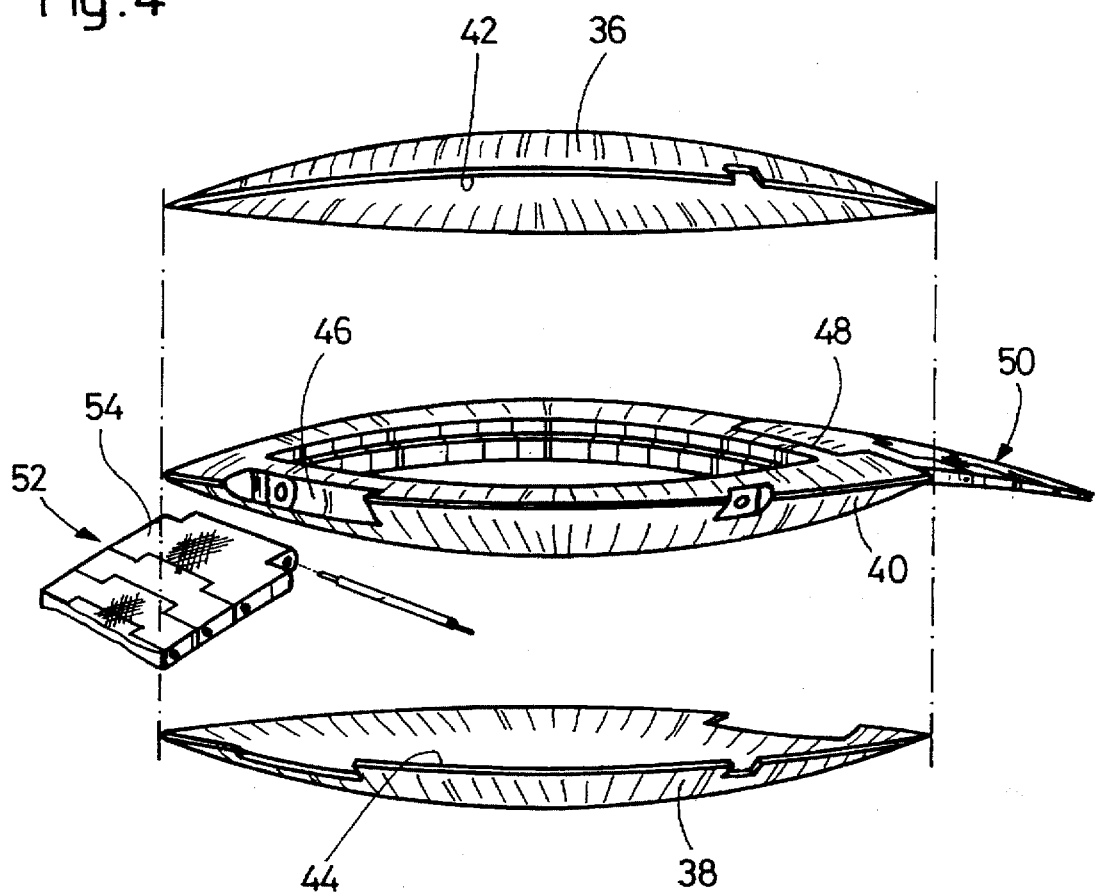
FIG. 4 shows a watch provided with two transparent scratchproof closure elements according to the invention, in this case a watch glass and a back cover, in exploded perspective.

In FIG. 4, one sees another example of the application of transparent scratchproof watch case closure elements according to the invention.

In this example, the watch case includes an upper shell 36 in the shape of a spherical calotte, at least part of which is transparent and which forms a first watch case closure element according to the invention.

The case also includes a lower shell 38, also in the shape of a spherical calotte, and a middle part 40 arranged in the vicinity of the periphery of shells 36 and 38, lower shell 38 forming a second watch case closure element according to the invention. As is seen in FIG. 4, shells 36 and 38 define an internal space in which there is a movement (not shown) and middle part 40 is arranged to correspond respectively to the shape of the lower and upper faces presented respectively by upper and lower shells 36 and 38 in order to act as their abutting surface. Thus, when the case is assembled, edges 42 and 44 of the upper and lower shells are joined along their entire periphery with the exception of points 46 and 48 provided for attaching bracelet strands 50 and 52, and the middle part no longer shows.

According to a particular embodiment, bracelet strands 50 and 52 may be formed of articulated links 54 also realised by sintering a pressed part of a general shape similar to that of the desired link, said pressed part being essentially formed of a powder or of a mixture of powders essentially comprising aluminium oxynitride or yttrium oxide, the sintered material obtained being transparent in the visible spectrum, and having a light absorption coefficient in the visible spectrum not exceeding 30% after sintering and polishing.

Here upper shell 36, namely the watch glass, and lower shell 38, namely the back cover, forming the transparent scratchproof closure elements are realised in the same way as the watch glass described in connection with FIGS. 1 and 2.

As the edges of the shells are joined, the case realised in this manner is completely scratchproof. Further, due to the spherical calotte shape of the closure elements according to the invention—normally very expensive when they are realised in artificial sapphire—the case thus obtained has high shock absorption features as the shocks are transmitted to the seat of the shells which is situated on the middle part onto which said shells are fixed (vault effect).

It is of course understood that here again the two shells may include at the periphery of their internal face a masking layer such as a metal-coating in order to hide certain elements of the case such as the middle part.

Although the present invention has been described in relation to particular embodiment examples, it is nonetheless clear that it is not limited to said examples and that it is capable of numerous variations and modifications without departing from its framework.

What is claimed is:

1. A transparent scratchproof watch case closure element, wherein it is realized by sintering a pressed part or an injected part having a general shape similar to that of said closure element, said part being formed essentially of a powder or of a mixture of powders of ceramic material wherein said closure element is transparent in the visible spectrum, and wherein said closure element is made of aluminum oxynitride having the composition $Al_{23-1/x}O_{27+x}N_{5-x}$, X being between 0.429 and 2.

2. The closure element according to claim 1, wherein it has a Vickers hardness greater than or equal to 1100.

3. The closure element according to claim 2, wherein it forms the watch glass or back cover of a watch case.

4. A watch case including a middle part, wherein it includes a closure element in conformity with the closure element defined in claim 3.

5. A watch case according to claim 4, wherein the closure element includes the watch glass and at least one part of the middle part.

6. The closure element of claim 1, having a light absorption coefficient not exceeding 30% in the visible spectrum.

7. The closure element of claim 6, wherein the light absorption coefficient is about 15% for a closure element having a thickness of about 2 mm.

8. A wrist watch comprising a watch case according to claim 5, comprising an articulated link bracelet, wherein each link is realized by sintering a pressed part or an injected part having a general shape similar to that of said link, said part being essentially formed of a powder or a mixture of powders of ceramic material, wherein said link is transparent in the visible spectrum, and wherein said link is made of aluminum oxynitride having the composition $Al_{23-1/x}O_{27+x}N_{5-x}$, X being between 0.429 and 2.

9. A wrist watch comprising a watch case according to claim 4, comprising an articulated link bracelet, wherein each link is realized by sintering a pressed part or an injected part having a general shape similar to that of said link, said part being essentially formed of a powder or a mixture of powders of ceramic material, wherein said link is transparent in the visible spectrum, and wherein said link is made of aluminum oxynitride having the composition $Al_{23-1/x}O_{27+x}N_{5-x}$, X being between 0.429 and 2.

10. The wrist watch according to claim 9, wherein each link has a Vickers hardness greater than or equal to 1100.

11. The wrist watch of claim 9, wherein each link has a light absorption coefficient not exceeding 30% in the visible spectrum.

* * * * *